United States Patent [19]

Gans et al.

[11] Patent Number: 4,914,443
[45] Date of Patent: Apr. 3, 1990

[54] ANGLE DIVERSITY SIGNAL SEPARATOR USING MODE CONVERSION

[75] Inventors: Michael J. Gans, Monmouth Beach, N.J.; Adolf J. Giger, Boxford; Chung-Li Ren, Andover, both of Mass.

[73] Assignee: AT&T Bell Laboratories, Murray Hill, N.J.

[21] Appl. No.: 224,606

[22] Filed: Jul. 26, 1988

[51] Int. Cl.[4] .................. H01Q 21/06; H01Q 13/00; H01P 1/16; H04B 1/18
[52] U.S. Cl. .................................. 342/361; 343/786; 455/280; 333/21 R
[58] Field of Search ............... 342/361, 362; 343/756, 343/780, 786; 455/269, 280, 289, 293, 282; 333/20, 21 A, 21 R

[56] References Cited

U.S. PATENT DOCUMENTS

| | | | |
|---|---|---|---|
| 3,284,725 | 11/1966 | Bowman | 343/756 |
| 4,160,952 | 7/1979 | Seastrand | 325/369 |
| 4,373,207 | 2/1983 | Hecken | 455/139 |
| 4,473,828 | 9/1984 | Mörz et al. | 343/786 |

OTHER PUBLICATIONS

E. H. Lin, A. J. Giger, and G. D. Alley, "Angle Diversity on Line-of-Sight Microwave Paths Using Dual-Beam Dish Antennas" I.C.C., 1987, paper 23.5.
A. Malaga and S. A. Parl, "Experimental Comparison of Angle and Space Diversity for Line-of-Sight Microwave Links" Milcom, 1985, paper 19.5.
R. W. Hubbard, "Angle Diversity Reception for LOS Digital Microwave Radio" Milcom, 1985, paper 19.6.
E. T. Harkless and H. F. Lenzing, "Excitation of Higher Order Antenna Modes by Multipath Propagation", IEEE Transactions on Communications Technology, Aug. 1967, pp. 597–603.

Primary Examiner—Thomas H. Tarcza
Assistant Examiner—Gregory C. Issing
Attorney, Agent, or Firm—Joseph A. Cameron

[57] ABSTRACT

In an angle diversity receiving system, the primary and diversity signals are produced by a waveguide signal separator coupled to a single receiving antenna.

The separator operates by converting selective higher order modes in the antenna into fundamental modes that will propagate in its two output waveguides. The result is a robust system that operates over a frequency band wide enough to cover both the 4 GHz and 6 GHz common carrier bands with both horizontally and vertically polarized signals, and that can use a wide variety of antennas.

13 Claims, 8 Drawing Sheets

FIG. 3
| | | E-FIELD DISTRIBUTIONS | | | |
|---|---|---|---|---|---|
| SIGNAL IN | PLANE T-T | PLANE F-F | PLANE A-A | FAR FIELD PATTERN | |
| $V_{SV}$ | 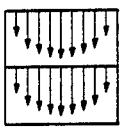 | 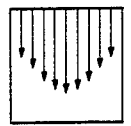 TE$_{10}$-MODE | 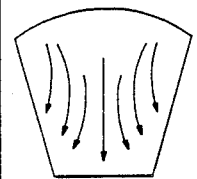 | 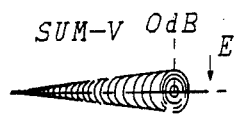 SUM-V 0dB | |
| $V_{DV}$ | 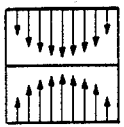 | 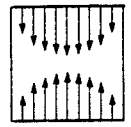 TE$_{11}$-TM$_{11}$ | 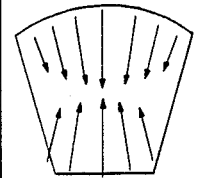 | 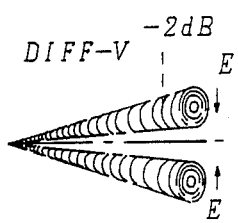 DIFF-V -2dB | |
| $V_{SH}$ | 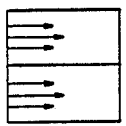 | 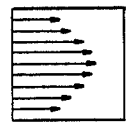 TE$_{01}$ | 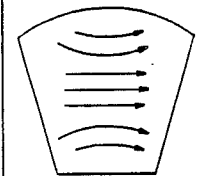 | 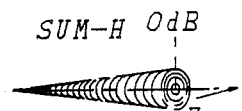 SUM-H 0dB | |
| $V_{DH}$ | 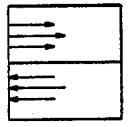 |  TE$_{02}$ | 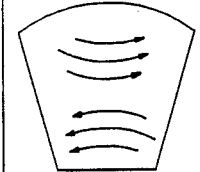 | 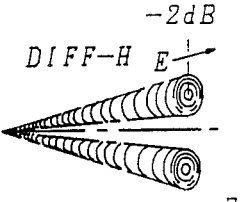 DIFF-H -2dB | |

FIG. 5
| | | E-FIELD DISTRIBUTIONS | | |
|---|---|---|---|---|
| SIGNAL IN | PLANE T-T | MODE COMBINATION | PLANE A-A | FAR FIELD PATTERN |
| $V_{1H}$ | 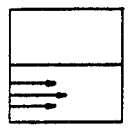 | 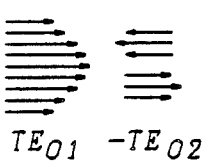 $TE_{01} - TE_{02}$ | 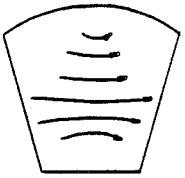 |  DOWN-H |
| $V_{2H}$ | 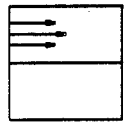 | 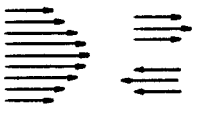 $TE_{01} + TE_{02}$ | 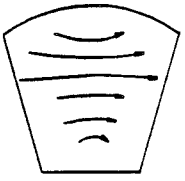 | 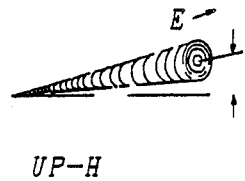 UP-H |
| $V_{1V}$ | 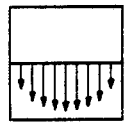 | 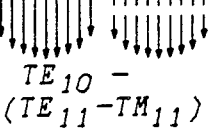 $TE_{10} - (TE_{11} - TM_{11})$ | 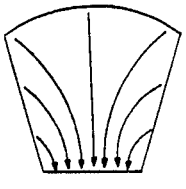 |  DOWN-V |
| $V_{2V}$ | 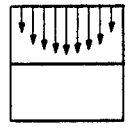 | 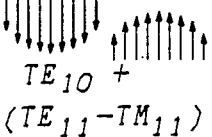 $TE_{10} + (TE_{11} - TM_{11})$ | 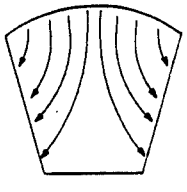 | 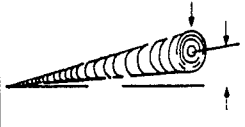 UP-V |

FIG. 6 FAR FIELD RADIATION FROM A SOURCE APERTURE

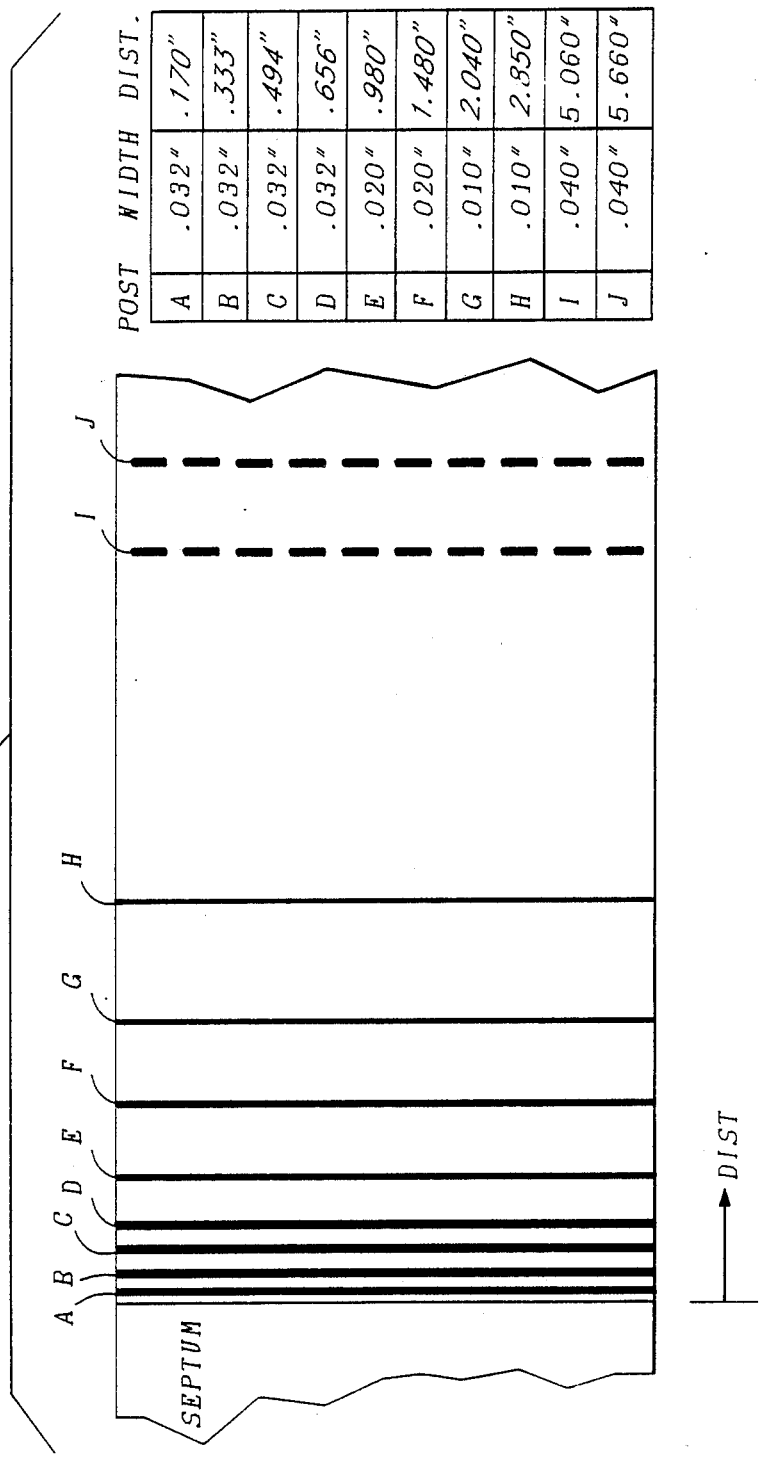

ANGLE DIVERSITY SIGNAL SEPARATOR USING MODE CONVERSION

TECHNICAL FIELD

This invention is in the field of radiated wave communications; more specifically, it relates to diversity reception apparatus for such communications.

In radiated wave communications such as microwave radio a serious limitation to reliable operation is multipath fading, which can result in temporary complete failure, or system outage. Multipath fading occurs when the transmitted signal arrives at the receiving antenna via two or more paths in a destructive phase relationship. It has been shown that the destructive phase relationship exists over only a narrow frequency band and a relatively small area of space at any one time. As a result, many receiving systems make use of an alternate signal, known as a diversity signal, during multipath fading periods to reduce the outage time. The diversity signal may be transmitted and received on a different carrier frequency in the case of frequency diversity, or received by an antenna located a vertical distance away from the primary antenna in the case of space diversity. Furthermore, the diversity signal may simply be substituted for the primary signal, or the two signals may be combined using some form of phase or amplitude adjustment.

Recently, further improvement has been observed with the use of a single parabolic dish antenna and two monopulse-type feeds. In the known arrangement, which is described in detail in "Angle Diversity On Line-of-Sight Microwave Paths Using Dual-Beam Dish Antenna", E. H. Lin et al., *IEEE International Conference on Communications '87*, June 7-10, 1987, pp. 23.5.1-23.5.11, the feeds are located one slightly above and the other slightly below the antenna focal point to pick up signals received by the antenna from slightly different respective vertical angles. THe diversity system making use of this arrangement has therefore been called "angle diversity". Although this known angle diversity system can provide significant improvement over space diversity systems in outage time, it appears to be limited in bandwidth, and to suffer approximately 6 db signal loss at the point of crossover between the primary and diversity signals. Further, it is not known how to extend its use to other antenna arrangements.

There are, however, thousands of currently operating microwave transmission systems in which a single horn reflector antenna serves to receive simultaneous signals (of both horizontal and vertical polarization) in both the 4 GHz and 6 GHz frequency bands. With the current popularity of digital communications, and the projected need for higher and higher transmission speeds, there is considerable incentive to utilize the existing antennas and their supporting towers for such high speed digital service. With the demands for error-free transmission created by digital service there is therefore a need for the advantages of angle diversity applied to these systems.

An object of this invention is a signal separator that can be used over a broad frequency band with a variety of antenna types to provide improved angle diversity reception.

Another object is a waveguide signal separator that generates angle diversity signals derived from multimode signals.

A third object is an angle diversity receiving system operating off a single antenna that provides effective diversity protection of both horizontally and vertically polarized signals over a broad frequency band.

SUMMARY OF THE INVENTION

This invention relies on the fact that when radiated signals enter an antenna aperture at an angle off boresight, higher order modes are generated. According to this invention, a waveguide diversity signal transducer comprises a multimode input section, an output section bifurcated by a septum to form two output waveguides and a mode transducer coupled between the input and output sections for converting selective higher order modes into fundamental modes that will propagate in one or both of the output waveguides. When the signal separator is coupled to a receiving antenna, the two output waveguides provide the primary and diversity signals, respectively, for a diversity receiving system.

BRIEF DESCRIPTION OF THE DRAWING

FIG. 3 is a table of electric field distributions useful in explaining the operation of the embodiment of FIG. 1.

FIG. 5 is a table of electric field distributions useful in explaining the operation of the embodiment of FIG. 4.

FIG. 8 is a detail drawing showing the dimensions of one embodiment of a mode separator according to the invention.

DETAILED DESCRIPTION

Figure 1:
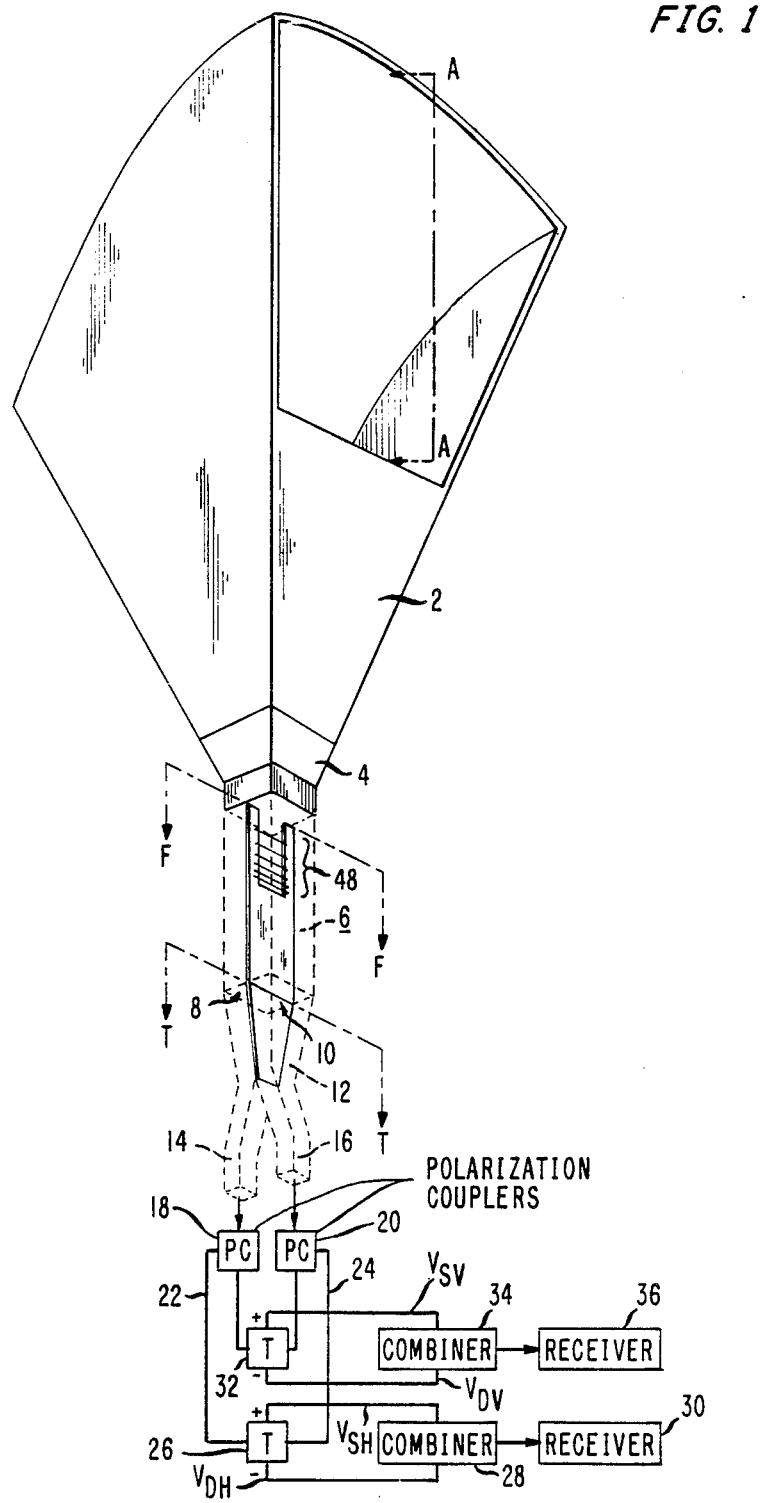
FIG. 1 is an angle diversity system embodying the invention.

An angle diversity system embodying the invention is shown in FIG. 1 in partly pictorial and partly block form. In FIG. 1 a pyramidal horn reflector 2 is aligned to receive the transmitted signals. A horn-to-waveguide transition unit 4, often called a "flowerpot" in antenna jargon, connects the received signal to a diversity signal separator 6, which separates primary and diversity signals into respective output ports 8 and 10. A dual transition waveguide section 12 provides a smooth transition between the rectangular output ports 8 and 10 and individual square waveguide sections 14 and 16 respectively. A pair of polarization couplers 18 and 20 coupled to waveguide sections 14 and 16, respectively, separate the horizontally and vertically polarized signals. The horizontally polarized signals are conducted via paths 22 and 24 to a magic Tee 26 or similar 3 db coupling device. One output of the magic Tee couples out a sum pattern signal, the other output a difference pattern signal to a diversity combining network 28, which selects a signal for receiver 30. In a similar manner, magic Tee 32 generates sum and difference pattern signals from the vertically polarized primary and diversity signals; these in turn are conducted to a combining network 34 for selection of a signal for receiver 36.

With the exception of diversity signal separator 6, all of the components of the system of FIG. 1 are well known in the art. The function of the diversity combiners 28 and 34 is to provide a more consistently adequate signal to their respective receivers 30 and 36. To do this they include sensing means to sense one or more parameters of their respective input signals and in one implementation switching means to connect one or the other of the input signals to their respective receivers. This may be considered combining the input signals on a time shared basis. In another implementation they may include continuous combining means using phase and/or amplitude adjusting means so that the signal passed to the receiver is a combination of the primary and diversity signals. Examples of such continuous combining units may be found in U.S. Pat. No. 4,160,952, which issued to K. L. Seastrand July 10, 1979, and in U.S. Pat. No. 4,373,207, which issued to R. P. Hecken Feb. 8, 1983.

Figure 2:
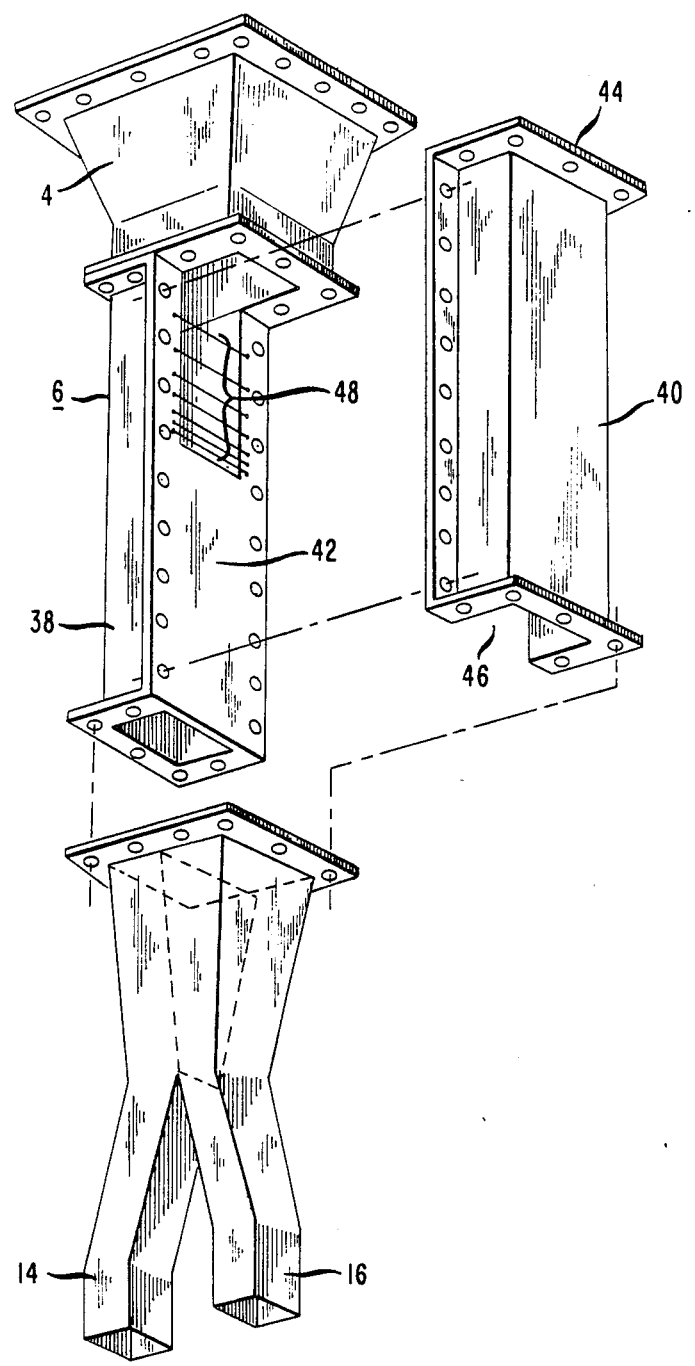
FIG. 2 is a detail drawing of a signal separator according to the invention.

An embodiment of the diversity signal separator of the invention is shown in the assembly drawing of FIG. 2. In this embodiment, signal separator 6 comprises two rectangular waveguide halves 38 and 40 respectively and a conductive septum 42. At the input end 44 of signal separator 6 the inner portion of septum 42 is cut away to be flush with the inner walls of waveguide halves 38 and 40. At the input end 44, therefore, which we will define as plane FF, signal separator 6 is an open waveguide of square cross section. At the output end 46, which we define as plane TT, septum 42 forms a solid conductive wall to divide separator 6 into two separate waveguides of rectangular cross sections. In between input end 44 and output end 46, a series of posts 48 in the plane of septum 42 form a mode transducing transition between the open square input and the bifurcated output.

It is well known that waveguide structures such as those shown in FIGS. 1 and 2 support fully reciprocal transmission. With that reciprocity as a justification, therefore, and clarity of understanding as a goal, we will describe the operation of the arrangements of FIG. 1 in terms of beam formation by considering, without loss of generality, that the antenna is transmitting instead of receiving. The table of FIG. 3 shows the electric field patterns that will exist at various locations in the system of FIG. 1 under certain excitation conditions.

Let us assume that a signal $V_{sv}$ is fed into the waveguide arrangement of FIG. 1 via the sum port of magic Tee 32. The resulting electric fields in plane T—T, existing in the two rectangular waveguide sections of separator 6 are shown in the first row, second column of FIG. 3, as viewed by looking down into the waveguide from the antenna aperture. At the output of the mode transducer towards the antenna, plane F—F, the electric field in the square waveguide is shown in the third column. It is the field of the fundamental mode $TE_{10}$. This fundamental mode is transformed into the pattern shown in the fourth column at the antenna aperture, plane A—A, and gives rise to the conventional far field antenna pattern with lobe maximum on boresight, as indicated in the last column of FIG. 3. Because of the way this signal was formed by feeding the sum port of magic Tee 32, this pattern is also called the sum pattern.

Feeding a signal $V_{dv}$ to the difference port of magic Tee 32 forms the set of electric fields shown in the second row of FIG. 3. This field distribution can be thought of as a combination of two higher ordre modes $TE_{11}$—$TM_{11}$. The far field radiation pattern has a null on boresight with lobes above and below in elevation. This pattern is also called a difference pattern. Similarly, for horizontal polarization, rows 3 and 4 of FIG. 3 explain the mode formation and the launching of the corresponding sum and difference patterns. The particular form of angle diversity described by FIG. 3 could also be called mode diversity.

By this analysis, and remembering that reciprocity exists, it can be seen that the arrangement of FIG. 1 can advantageously be used to derive effective diversity signals to maintain system performance from the various directional beams that cause multipath fading.

For best operation, the arrangement of FIG. 1 requires precise phase alignment at the waveguide junction points. The system, however, may be spread over several hundred feet, with square waveguide sections 14 and 16 located near the top of an antenna tower and combiners 28 and 34 normally located in a building at the foot of the tower. Polarization couplers 18 and 20 are therefore best connected directly to waveguide sections 14 and 16, and the long runs connecting the sum and difference outputs from magic Tees 26 and 32 and combining units 28 and 34 are best traversed using fundamental mode elliptical waveguide. In general this arrangement has a bandwidth to cover one common carrier frequency band.

Figure 4:
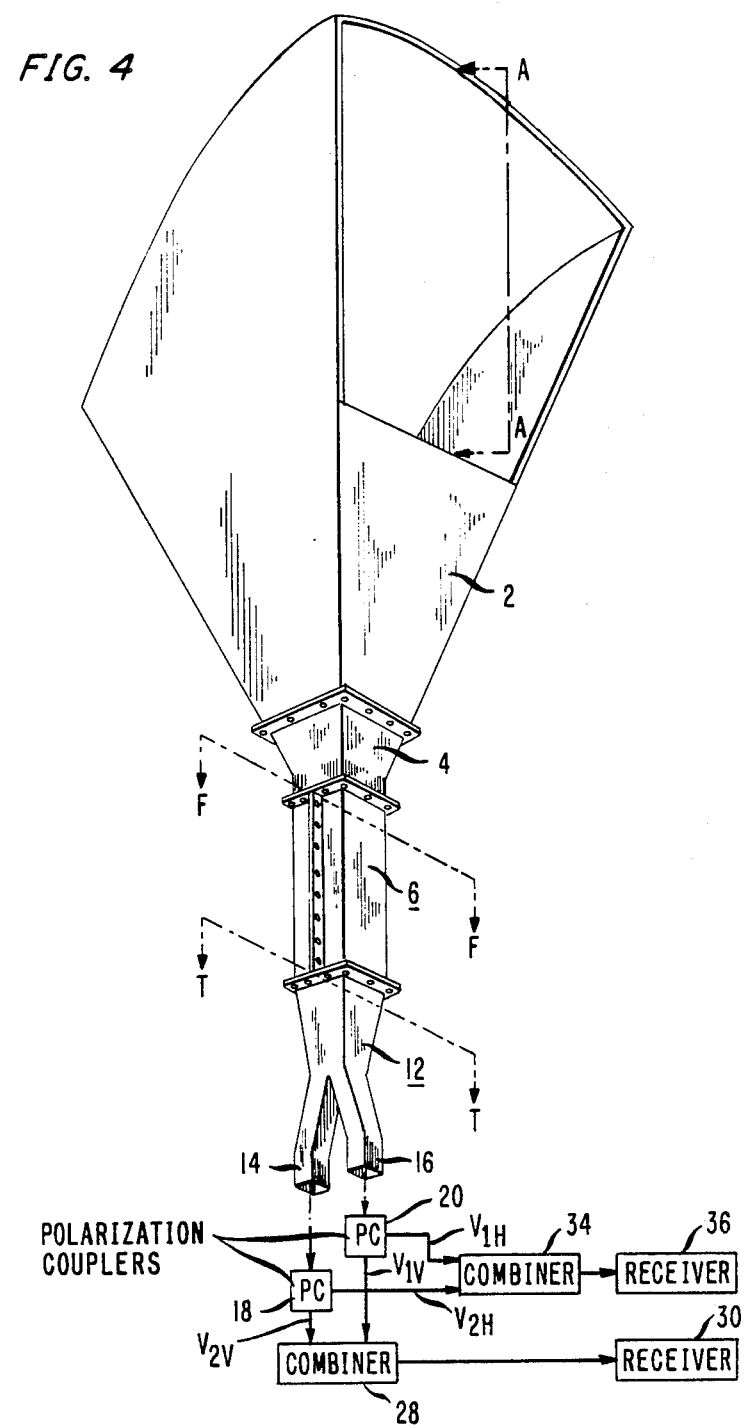
FIG. 4 is a preferred angle diversity system embodying the invention.

A preferred embodiment with a considerably broader bandwidth and which lacks the critical phase requirements is shown in FIG. 4. This arrangement may be similar to that of FIG. 1, but simpler in that there is no need for magic Tees; the outputs of polarization couplers 18 and 20 can be connected directly to combiners 28 and 34.

For the same reasons that applied to FIG. 1, the operation of the embodiment of FIG. 4 can be more readily explained in terms of beam formation by considering the antenna to be transmitting instead of receiving. The table of FIG. 5 is used in this explanation. Feeding a signal $V_{1H}$ into the horizontally polarized output of polarization coupler 20 of FIG. 4 results in the field distributions given in the first row of FIG. 5. Since only one of the two waveguides at plane T—T carries a signal, the field at plane F—F can be thought as being made up of the difference of the two modes $TE_{01}$ and $TE_{02}$ shown in the third column.

This results in a far field antenna pattern that is tilted downwards in elevation from boresight, as shown in the last column. In like manner, feeding a signal $V_{2H}$ into the horizontally polarized output of coupler 18 results in a far field pattern that is tilted upward, representing the sum of the two modes $TE_{01}$ and $TE_{02}$, as illustrated by the second row of FIG. 5. The formation of the corresponding upward and downward directed beams by feeding the vertically polarized outputs of couplers 20 and 18 respectively are also illustrated by the remaining two rows.

The explanation used in connection with FIG. 5 made the assumption that the two modes $TE_{01}$ and $TE_{02}$, for instance, are added exactly in phase or out-of-phase, $TE_{01}$ plus $TE_{02}$ or $TE_{01}$ minus $TE_{02}$. In an angle diversity application (as opposed to a monopulse radar application) an exact in-phase or out-of-phase addition is not necessary. Any phase shift is acceptable. Consider the far field pattern of modes launched from a square aperture. FIG. 6a is a plot of E field strength as a function of elevation angle from boresight for the fundamental mode $TE_{01}$; FIG. 6b is a similar plot for the higher order mode $TE_{02}$. FIG. 7a shows the vector addition of these two patterns with relative phase difference $\gamma$ between them of 0 degrees and 180 degrees. Since all of these curves are plotted in db, conversion to a linear voltage scale has to be made before the addition can be performed. It must also be remembered that the voltage is inverted in adjacent lobes. Curve 41 represents the in phase addition of fundamental and higher order modes i.e., $TE_{01} + TE_{02}$, such as depicted in the second row of the table of FIG. 5. Curve 42 represents the same addition with a 180 degree phase shift of the $TE_{02}$ pattern. This is $TE_{01}-TE_{02}$ as depicted in the first row of FIG. 5. Curves 41 and 42, therefore, represent the far field patterns of the signals $V_{2H}$ and $V_{1H}$, respectively. It should be noted that the intersection of curves 41 and 42 occurs 3 db below the maximum signal points. The meaning of this observation is that in an angle diversity receiving system, according to the invention, when the fundamental and higher order modes are added and subtracted in phase to derive the primary and diversity signals, the boresight crossover point is only 3 db below maximum primary signal strength. This is a lesser loss than the typical 6 db found in angle diversity dish antennas that use offset feeds.

Figure 6:
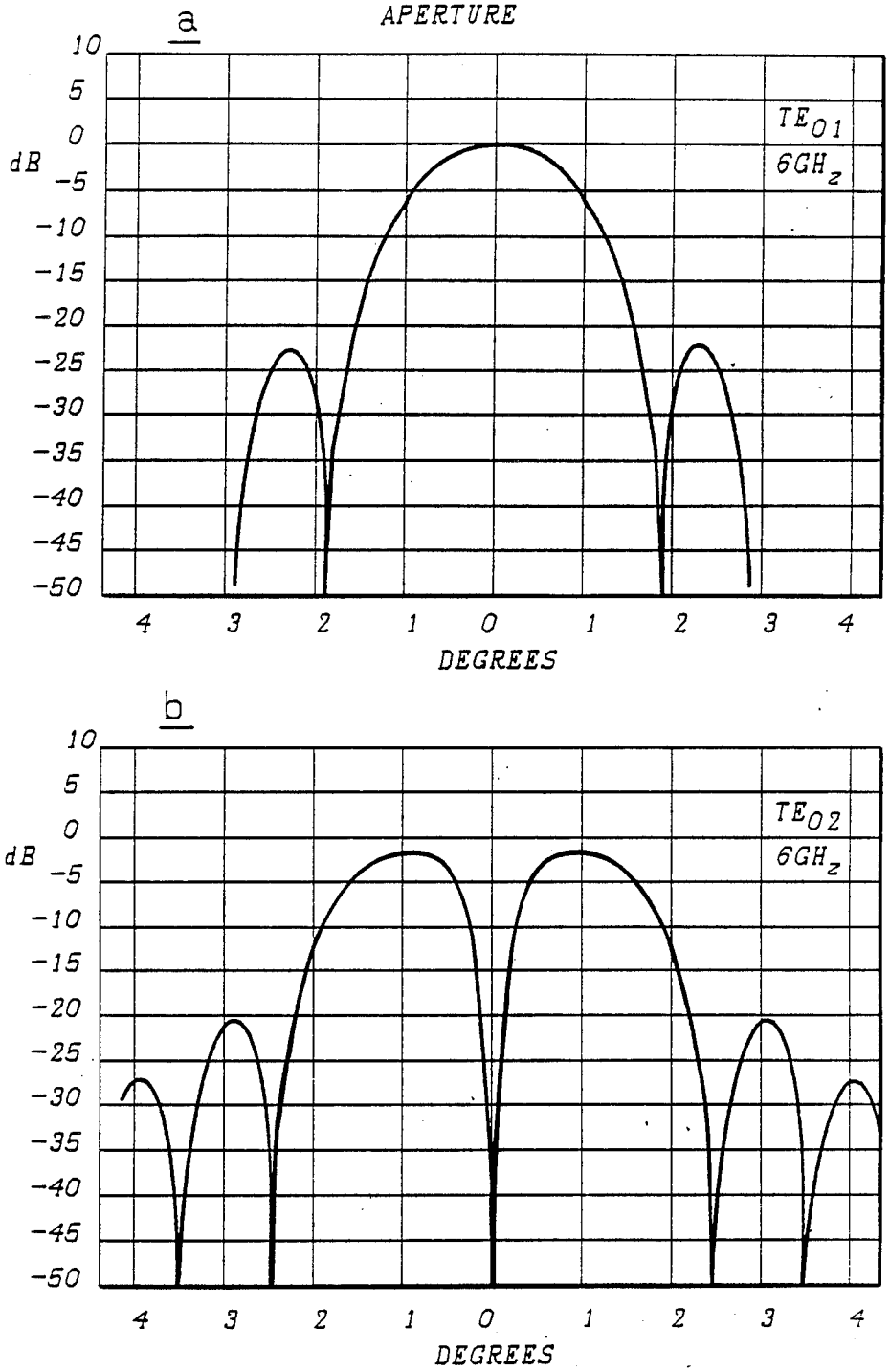
FIG. 6, a and b are plots of far field radiation patterns from square apertures, useful in explaining the operation of the embodiment of FIG. 4.
Figure 7:
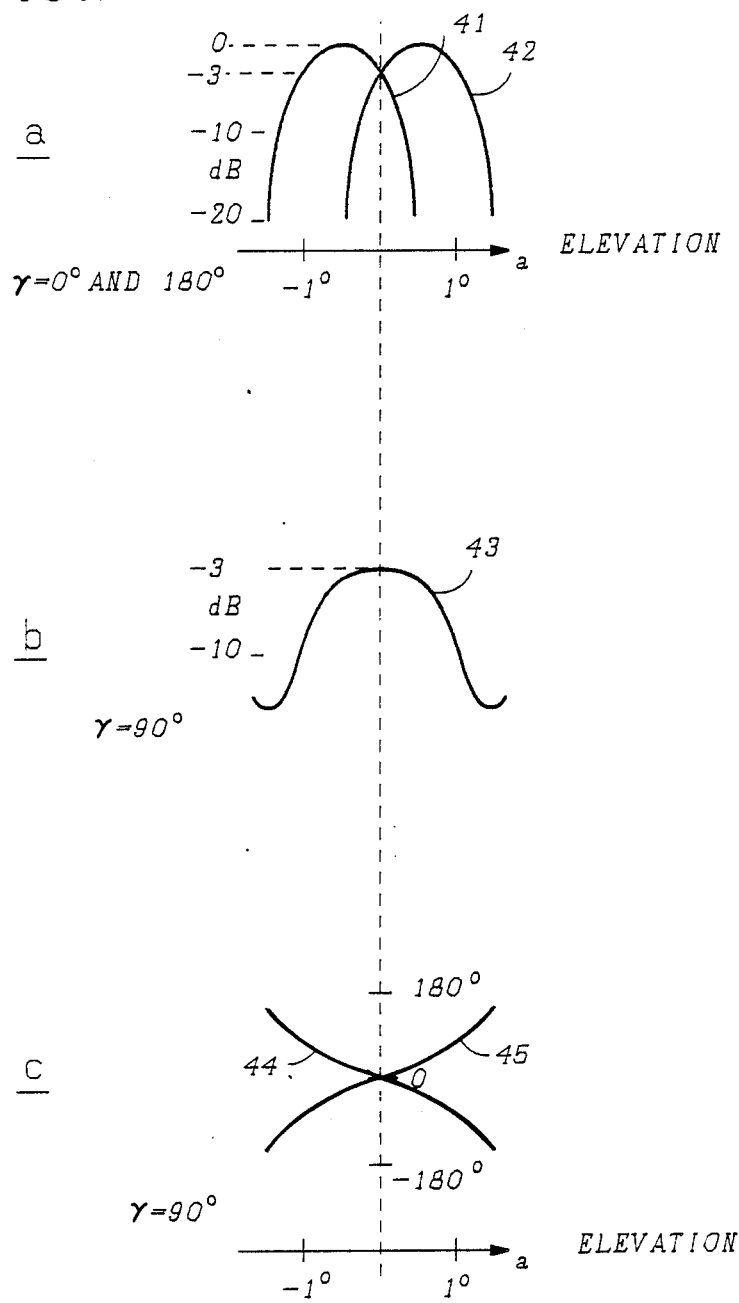
FIG. 7 is a set of plots showing the addition of the patterns of FIG. 6.

Now consider the curves of FIG. 7b in which the same patterns of FIG. 6 are added, but with a phase difference $\gamma$ between them of 90 degrees. Curve 43 represents the vector addition of these two modes; it is the same for $TE_{01} + TE_{02}$ and $TE_{01}-TE_{02}$, with a peak again only 3 db below the peak of the sum pattern. FIG. 7c depicts the phase shift of these resultant signals as a function of elevation angle. Curve 44 represents the phase of the sum of the modes and curve 45 the phase of the difference of the modes. Note that although the amplitude patterns are actually identical, there is a strong phase shift with elevation angle that is opposite in sign for the two patterns. This is enough to make angle diversity work. This finding is of great practical importance since the phase shift between the modes doesn't have to be controlled. Such a control could be very difficult to achieve over a wide band of frequencies in the configuration of FIG. 4. This is because the various modes propagate at different speeds in the horn part of the antenna and the modes will therefore have different phase relations (in the aperture plane A—A) as a function of frequency. It should also be noted that in the situation depicted by the pattern of FIG. 7a, the phase shift across each beam remains constant.

Because the phase relationship angle $\gamma$ between signals does not have to be controlled in the embodiment of FIG. 4, the signals may advantageously be guided from waveguide sections 14 and 16 to the inputs of polarization couplers 18 and 20 by various well known structures. These components may be separated by several hundred feet, sections 14 and 16 being near the top of an antenna tower and couplers 18 and 20 at the foot of the tower. In one alternative, the square waveguide may be continued over this distance. In another alternative, the square waveguide may be flared out into a larger overmoded low loss, circular waveguide commonly used in horn reflector installations. In a third alternative, polarization couplers 18 and 20 may be connected directly to sections 14 and 16 and band separation networks added if multiband operation is required. Very often polarization couplers and band separation networks are integrated in a common unit. Elliptical fundamental mode waveguide can then be used, one for each polarization and frequency band, to connect to combiners 28 and 34 normally located in a building at the foot of the tower. Still other connecting arrangements will occur to persons skilled in the art.

Another advantage of the invention described is the scaling of the pattern offset angles with frequency. This is due to the use of waveguide modes in beam formation. With offset feeds in the focal plane of a parabolic reflector, the pattern tilt angles are fixed because they are determined by geometric optics. This leads to a crossover loss at boresight that changes with frequency and, in general, cannot be reduced much below 6 db.

Mode transducing signal separator 6, shown in FIG. 2, can be designed using well known approaches. This mode transducer is essentially a 3 db directional coupler with two output ports operating into dominant mode waveguide sections 14 and 16 and the other two terminals represented by the sum and difference modes in plane F—F. The dimensions of the waveguide sections are chosen, of course, to propagate the desired modes at the operating frequencies. In addition to coupling all of the desired modes, as shown in FIG. 3 or FIG. 5, the mode transducer must provide very good impedance matching looking in both directions to avoid significant reflections.

The successful approach illustrated in FIG. 2 uses conducting posts in the plane of the septum. As the distance from the septum increases, the posts are thinner and the distances between them greater. Other coupling techniques known to those skilled in the art are of course possible; the chosen structure, however, has some distinct advantages. First, this post array structure perturbs only incoming modes whose field is parallel to the posts, eg., $TE_{01}$. Second, from the $TE_{01}$ mode, it excites only modes with no electric field variation in the direction paralled to the posts, that is, only $TE_{0m}$ modes. Third, since the posts are centered, m is odd only. Finally, this structure can be represented for analysis as a series of inductors separated by the respective waveguide sections. With this analysis, the structure can be designed to eliminate the undesirable $TE_{03}$ mode. Since it is a propagating mode, excitation of $TE_{03}$ would represent a loss to the received signal.

For simplicity in fabrication, the post array, or "harp" can be formed on a double faced printed wiring board that can be clamped between waveguide halves 38 and 40. The septum may also be part of the board. FIG. 8 shows the dimensions, in inches, of such a configuration that operates well across the 4 and 6 GHz bands and both polarizations.

The printed wiring board in this successful configuration is 0.032" thick low loss dielectric with 0.001" thick copper patterns on each side. The large multimode waveguide section at plane F F is 3.644" square; The rectangular sections at plane T—T are 1.79"×3.644", with 0.064" septum. The waveguide sections 14 and 16 are 1.79" square. The two dashed line conductive patterns inserted at the antenna end of the mode transducer form capacitive elements to more closely match impedances.

While we have described a structure that operates well to provide improved angle diversity from a single pyramidal horn reflector antenna, it will be obvious to those skilled in the art that the principles and scope of the invention can be applied to other structures and other antennas. By way of example and not limitation, the signals from a conical horn reflector can be led to the diversity signal separator via circular waveguide and a round to square transition. In addition, the assemblies connected to the pyramidal horn reflector antenna in FIG. 1 and FIG. 4 can be used as focal point feeds in parabolic antennas, either center fed or offset fed, or in a Cassegrain configuration, to provide the improved angle diversity performance.

We claim:

1. A waveguide diversity signal separator comprising a multimode input section for supporting both fundamental modes and higher order modes of received antenna signals;
   an output section bifurcated by a conductive septum to form two waveguides; and
   mode transducer means between said input section and said output section for converting selective higher order modes into fundamental modes that will propagate in said bifurcated output section.

2. A waveguide diversity signal separator, as in claim 1, wherein said multimode input section has a square cross-section and said waveguides have rectangular cross-sections.

3. A waveguide diversity signal separator, as in claim 2, further comprising waveguide transition means coupled to said respective rectangular waveguides of said output section to form two separate square output ports.

4. A waveguide diversity signal separator, as in claim 1, wherein said transducer means comprises an array of parallel electrically conductive posts in the plane of said septum connecting opposite waveguide faces.

5. A waveguide diversity signal separator, as in claim 4, wherein said posts comprise conductive paths on a low loss dielectric substrate.

6. A waveguide diversity signal separator, as in claim 4, wherein the posts of said array nearest said septum are thicker than the posts furthest from said septum.

7. A waveguide diversity signal separator, as in claim 4, wherein the posts of said array nearest said septum are closer together than the posts furthest from said septum.

8. A waveguide diversity signal separator, as in claim 4, further comprising at least one post electrically insulated from said opposite waveguide faces to form a capacitive element.

9. A diversity receiving system for providing receiving means with an improved signal version of a transmitted signal comprising
   receiving antenna means for receiving said transmitted signal;
   diversity signal separating means coupled to said antenna means for obtaining a primary signal version and a diversity signal version of said received signal;
   combining means for combining said primary signal version and said diversity signal version to produce said improved version; and
   means connecting said improved signal version to said receiving means characterized in that
   said diversity signal separating means comprises a multimode input section for supporting both fundamental modes and higher order modes of said received signal;
   an output section bifurcated by a conductive septum to form two waveguides for producing said primary signal version and said diversity signal version; and
   mode transducer means between said input and output sections for converting selective higher order modes into fundamental modes that will propagate in said bifurcated output section.

10. A diversity receiving system, as in claim 9, wherein said combining means comprises switching means to combine said primary signal version and said diversity signal version on a time share basis to produce said improved signal version.

11. A diversity receiving system, as in claim 9, wherein said combining means combines said primary signal version and said diversity signal version on a continuous basis to produce said improved signal version.

12. A diversity receiving system, as in claim 11, wherein said combining means comprises coupling means for coupling said primary signal version and said diversity signal version to produce a sum signal and a difference signal and switching means for combining said sum and difference on a time share basis.

13. A diversity receiving system, as in claim 11, wherein said combining means comprises coupling means for coupling said primary signal version and said diversity signal version to produce their sum and difference, and sum and difference signal combining means for combining said sum and difference on a continuous basis.

* * * * *